United States Patent [19]

Markowitz

[11] 4,150,862
[45] Apr. 24, 1979

[54] TERMINATION FOR A REINFORCED PLASTIC HOSE

[75] Inventor: Alan E. Markowitz, Waterford, Conn.

[73] Assignee: The United States of America as represented by the Secretary of the Navy, Washington, D.C.

[21] Appl. No.: 874,973

[22] Filed: Feb. 3, 1978

[51] Int. Cl.² .............................................. H01R 3/04
[52] U.S. Cl. .................................. 339/15; 339/16 R; 340/6 R
[58] Field of Search ................ 340/8 A, 8 MM, 9, 11, 340/6 R, 7 R; 339/15, 16 R

[56] References Cited

U.S. PATENT DOCUMENTS

| | | | |
|---|---|---|---|
| 2,864,073 | 12/1958 | Harris | 340/8 R X |
| 2,880,404 | 3/1959 | Harris | 340/8 R |
| 3,418,624 | 12/1968 | Massa | 340/8 MM |
| 3,480,907 | 11/1969 | King | 340/9 |
| 3,881,165 | 4/1975 | Parker et al. | 340/11 X |
| 3,893,063 | 7/1975 | Park et al. | 340/6 R |
| 3,930,254 | 12/1975 | Pavey, Jr. | 340/7 R |
| 4,079,965 | 3/1978 | Moughty et al. | 339/16 R X |

*Primary Examiner*—Roy Lake
*Assistant Examiner*—DeWalden W. Jones
*Attorney, Agent, or Firm*—Richard S. Sciascia; Arthur A. McGill; Prithvi C. Lall

[57] ABSTRACT

A mechanical assembly system for use in joining sections of towed arrays. A typical section comprises an outer hose housing with aramid fiber strength members suitable for enclosing a line array of sensors and electronic equipment that are submerged in water and towed by a vessel. The hose is normally oil filled. The system includes an inner sleeve assembly, a cuff assembly, a bulkhead for forming an oil tight barrier and connecting electrical wiring, a positioning ring and a plurality of discs for spreading and terminating the aramid fiber strength members. In addition adhesives are used at various mechanical connections in the system.

13 Claims, 6 Drawing Figures

4,150,862

TERMINATION FOR A REINFORCED PLASTIC HOSE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to towed array assemblies and more particularly to the mechanical termination attached to each end of each hose section in a towed array. These arrays are normally towed from a vessel at sea.

A towed array is comprised of an outer hose which houses a line array of sensors and electronics. It is generally oil filled and is made up in hose sections of varying lengths which are interconnected. The terminations are required to be rigidly attached to the hose, be capable of carrying the loads associated with tension in the array, transmit these loads via a mechanical connector to the adjoining array section, provide adequate sealing surfaces to prevent fluid leakage, accommodate bulkheads with electrical connectors for transmission of electrical signals through the bulkheads and be designed for reliability in an at-sea environment.

Recent technological advances have demonstrated significant advantages in using extruded hoses from various polyvinyl chloride and urethane compounds that are reinforced with longitudinal strength members such as nylon and aramid fibers. These strength members carry and transmit the tension loads produced by hydrodynamic drag as the array is towed through water. It is therefore an object of the present invention to provide a termination which satisfies the above requirements and is compatible with these new reinforced extruded hoses.

Prior art towed array hoses were made from reinforced rubber. Terminations were swaged onto this rubber. However, when this technique is used on a reinforced polyvinyl chloride or urethane hose the load carrying ability of the termination is much lower than the breaking strength of the reinforcing material. The termination then becomes the limiting factor in maintaining the towed array's overall structural integrity.

SUMMARY OF THE INVENTION

The present invention provides a termination that is as strong as the hose reinforcement. This increases the structural integrity to the breaking strength of the reinforcing material.

This is accomplished by extending the strength members and affixing them to discs in the termination assembly. In addition the hose is forced into a press fit with other components of the assembly. A rubber antiflex sleeve is used at the location where the termination ends within the hose to prevent excessive flexing at what would normally be a high stress point. The sleeves used in the termination have various protrusions and indentations to provide for optimum locking of components when used in conjunction with an epoxy compound.

DESCRIPTION OF THE PREFERRED EMBODIMENT

Referring now to the figures there is shown a termination 10 as applied to a polyvinyl chloride hose 12 reinforced by longitudinal aramid fiber tapes 14. In the present embodiment there are six tapes with each tape 14 approximately ½ inch wide located in the middle of a 0.200 inch wall of a 2.7 inch diameter hose 12. The basic concepts, however, can be applied to any reasonable size hose 12 of various materials and any reasonable size and number of tapes 14.

Figure 1:
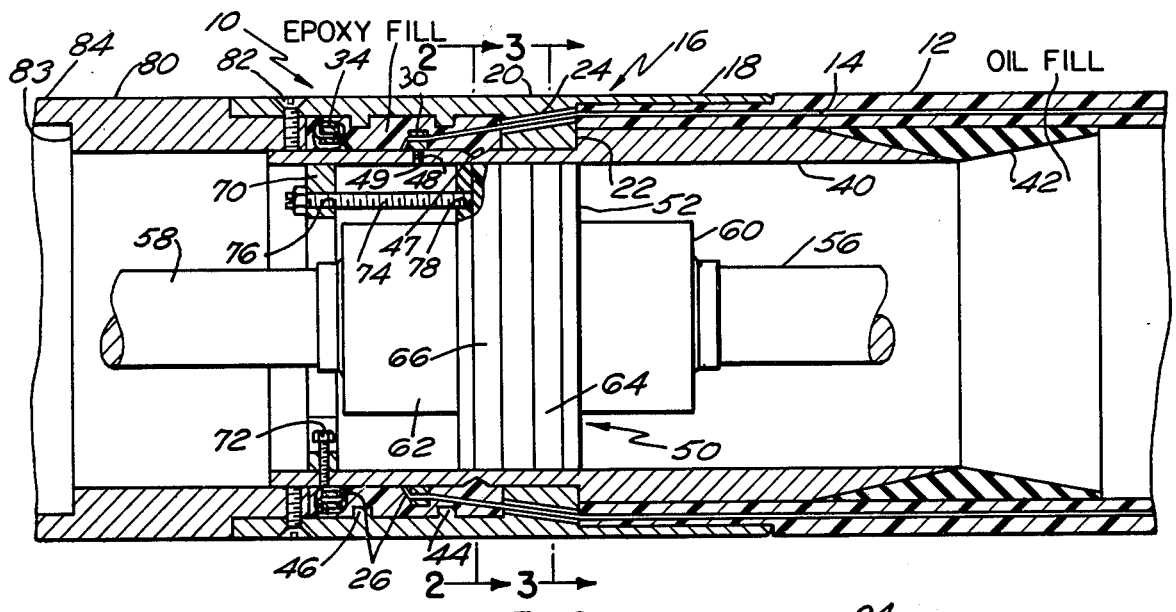
FIG. 1 is a sectional view along the longitudinal axis of a termination assembly for a reinforced hose in accordance with the present invention.
Figure 3:
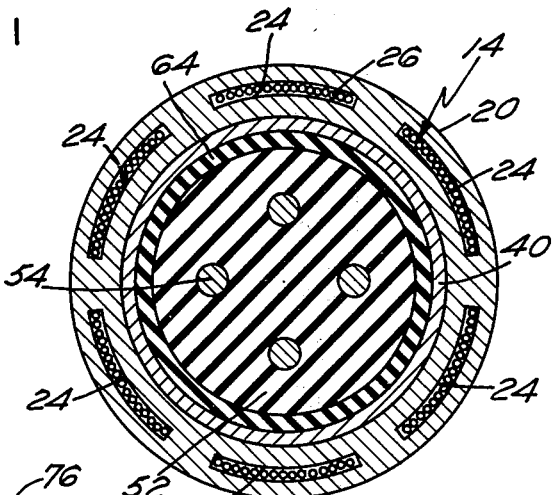
FIG. 3 is a transverse sectional view along the line 3—3 of FIG. 1.

A hose termination 16 is essentially a socketed type with a compression fit of a cuff 18 of outer sleeve 20. The end of hose 12 abuts flange 22 of outer sleeve 20. The tapes 14 are brought through slots 24 in flange 22 as shown in FIGS. 1 and 3. FIG. 3 shows that each aramid fiber tape 14 has a plurality of strands 26.

Figure 4:
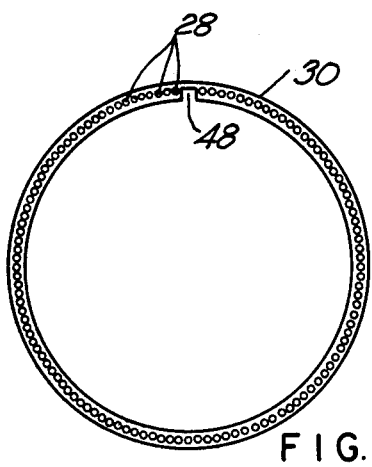
FIG. 4 is a view of the spreader disc of FIG. 1.
Figure 5:
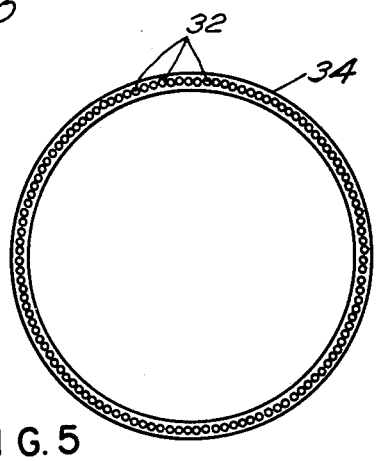
FIG. 5 is a view of the termination disc of FIG. 1.

After passing through slots 24, the individual strands 26 are separated and passed through apertures 28 in spreader disc 30. A view of spreader disc 30 is shown in FIG. 4. Each individual strand 26 remains almost uniformly straight in the area near slots 24, between slots 24 and the spreader disc 30. This allows the load to be taken up with no bending or twisting of the strands 26. The strands 26 are then brought through the apertures 32 in termination disc 34. The termination disc 34 is then rotated. A view of termination disc 34 is shown in FIG. 5.

An inner sleeve 40 also abuts hose 12 and has bonded to it a rubber antiflex sleeve 42 that prevents excessive flexing at an otherwise high stress area where historically hoses have been known to fail. The antiflex sleeve 42 is absolutely crucial in a hose where large elongations occur and a severe necking down problem exists. With respect to other hoses, the antiflex sleeve will prolong the life of the termination.

Figure 2:
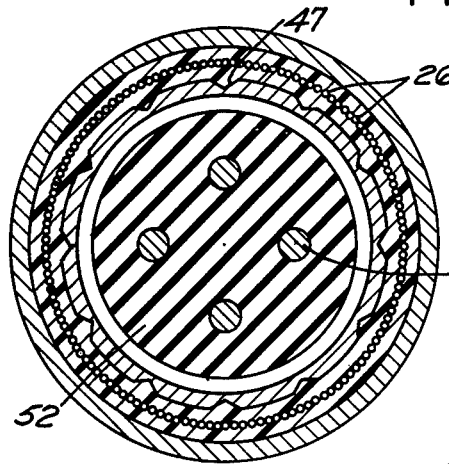
FIG. 2 is a transverse sectional view along the line 2—2 of FIG. 1.
Figure 6:
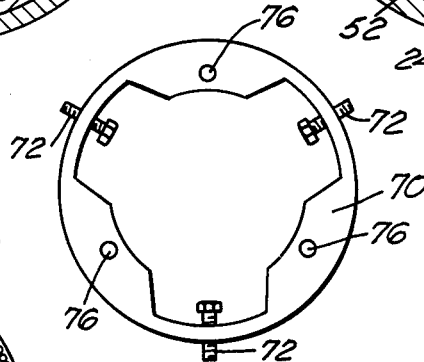
FIG. 6 is a view of the jacking screw of FIG. 1.

A bulkhead 50 is required to cap off the oil filled section and provide a sealed unit through which electrical conductors can be brought. A connector 52 having conductors 54 is shown in FIGS. 2 and 3 connecting electrical wires 56 and 58 through respective connector plugs 60 and 62. The connector 52 has a pair of O-rings 64 and 66 abutting the surface of inner sleeve 40. The inner sleeve 40 requires an O-ring inner surface for this purpose. The bulkhead is positioned by means of jacking screw ring 70 which is connected to inner sleeve 40 by means of screws 72. The bulkhead 50 is positioned by three jackings screws 74 which pass through apertures 76 in ring 70 to apertures 78 in connector 52. A view of the jacking screw ring 70 is shown in FIG. 6.

In addition to the above features the outer sleeve contains lips 44 and 46, and the inner sleeve contains countersinks 47 to provide positive locking surfaces to prevent any possible slippage following the addition of epoxy which will be explained later. The spreader disc 30 contains a keyhole 48 for set screw 49. The function of the keyhole 48 and set screw 49 will be explained later.

A housing 80 is connected to outer sleeve 20 by means of screws 82. The housing 80 has a shoulder 83 for providing a thin extension section 84. The volume surrounded by section 84 is enlarged for electrical termination purposes or additional electrical or electronic equipment associated with the cables 56 and 58.

A continued description can best be made by describing the assembly procedure. First the inner sleeve 40 with its associated rubber antiflex sleeve 42 is inserted into the hose 12 to a point beyond where its final location is expected. The cuff 18 of outer sleeve 20 is then forced over the hose 12 with the aramid fiber tapes 14 coming through the slots 24. In the present system the aramid fiber tapes 14 are extended beyond the hose 12 for at least 24 inches to allow for a firm grip on the tapes 14 in pulling the hose 12 tight against flange 22. The inner sleeve 40 is then retracted until it is hard up against the flange 22. This forms a compression fluid tight fit on the hose 12. If necessary a sealing compound can be added to effect this fluid tight fit. During this time equal tension is maintained on the extended tapes 14 to prevent the hose from creeping back away from the wall of flange 22 and to insure equal distribution of eventual loads on the tapes.

The tapes 14 are spread into individual strands 26 that are brought through the apertures 28 in spreader disc 30. The disc 30 is then slid into place over inner sleeve 40. Set screw 49 is inserted through inner sleeve 40 into keyhole 48 to keep the spreader disc 30 from rotating with respect to sleeve 40. With slight tension again applied to strands 26, epoxy is now used to pot the assembly from the flange 22 to the spreader disc 30 between inner and outer sleeves 20 and 40. When the epoxy is fully set up, tension on strands 26 can be removed. The strands 26 are now brought through apertures 32 and looped around termination disc 34. Disc 34 is then slid over inner sleeve 40 and inserted in place. The disc 34 is then rotated to take up the slack in strands 26. Epoxy is then inserted from spreader disc 30 to slightly beyond termination disc 34 to complete the potting. The connector 52 is mated to connector plug 62 and connector plug 60, and inserted in place. The oil filling can precede the previous step or can be inserted via a filling port (not shown) on the bulkhead. The jacking screw ring 70 is mounted in place by means of screws 72 and the final positioning of the bulkhead 50 is made with jacking screws 74.

Housing 80 or any other extension can then be connected to sleeve 20 by means of screws 82. If one were to connect the hose 12 to an additional hose, the termination for the additional hose would be a mirror image of the one shown.

There has therefore been described a hose termination assembly 10 for towed arrays that is much stronger than those formed in the prior art. It is comprised of the features of embedding strength members in epoxy, maintaining a uniformly straight section of the strength members, compressing the hose 12 to effect sealing, incorporating an antiflex sleeve 42 to reduce wear at a high stress point, spreading the strength members into individual strands 26, locking the strength members between the spreader disc 30 and the termination disc 34 by twisting and bunching the individual strands 26 in an epoxy bed, using an O-ring surface to provide adequate sealing for the bulkhead 50, using positive locking surfaces on the cuff 18 and inner sleeve 40 to prevent any possible slippage and incorporating jacking screws 74 to carefully position the bulkhead 40.

It will be understood that many additional changes in the details, materials, steps and arrangement of parts, which have been herein described and illustrated in order to explain the nature of the invention, may be made by those skilled in the art within the principal and scope of the invention as expressed in the appended claims.

What is claimed is:

1. A termination assembly for an array comprising:
    an outer sleeve having a flange on its inner wall with a cuff extending axially from said flange;
    an inner sleeve having a protrusion abutting said flange;
    a reinforced hose compressed between said inner and outer sleeves and abutting said flange to form a fluid tight connection with said inner and outer sleeves, said hose having reinforced components extending from at least one end; and
    termination means surrounding said inner sleeve for terminating said reinforced components.

2. A termination assembly for an array according to claim 1 further comprising a bulkhead having a sealing means for providing a fluid seal.

3. A termination assembly for an array according to claim 2 wherein said sealing means further comprises:
    an electrical connector adapted to provide electrical conduction through said sealing means; and
    an O-ring seal abutting the inner surface of said inner sleeve and the outer surface of said connector.

4. A termination assembly for an array according to claim 3 wherein said sealing means further comprises a jacking ring assembly connected to said inner sleeve and said connector for positioning said connector within said inner sleeve.

5. A termination assembly for an array according to claim 2 further comprising an antiflex sleeve connected to an end of said inner sleeve and abutting said reinforced hose.

6. A termination assembly for an array according to claim 5 wherein said reinforced components of said hose comprise a plurality of aramid fiber tapes with each of said tapes having a plurality of strands.

7. A termination assembly for an array according to claim 6 wherein said termination means comprises:
    a first disc fixedly connected to said inner sleeve, said first disc including a plurality of apertures for passing through said aramid fiber strands; and
    a second disc including a plurality of apertures for passing through said aramid fiber strands, said first and second discs axially spaced along said inner sleeve; and
    said portion of said aramid fiber strands between said first and second disc wound around said inner sleeve.

8. A termination assembly for an array according to claim 7 wherein said outer sleeve flange is located between said one end of said hose and said first disc, said outer sleeve flange having a plurality of apertures for passing through said aramid fiber tapes.

9. A termination assembly for an array according to claim 8 wherein said outer sleeve comprises a first lip between said outer sleeve flange and said first disc, and a second lip between said first and second lips.

10. A termination assembly for an array according to claim 9 wherein the area between said flange and said second disc and including a small area on the side of said second disc away from said flange includes an epoxy fill.

11. A termination assembly for an array according to claim 10 wherein said inner sleeve comprises a plurality of grooves in the area of said epoxy fill.

12. A termination assembly for an array according to claim 11 wherein said sealing means further comprises:
an electrical connector adapted to provide electrical conduction through said sealing means; and
an O-ring seal abutting the inner surface of said inner sleeve and the outer surface of said connector.

13. A termination assembly for an array according to claim 12 wherein said sealing means further comprises a jacking ring assembly connected to said inner sleeve and said connector for positioning said connector within said inner sleeve.

* * * * *